Patented July 14, 1931

1,814,980

UNITED STATES PATENT OFFICE

FRIEDRICH THOMAS, OF GROSS-SALZE, GERMANY

PROCESS FOR THE PRODUCTION OF TRINITROTOLUENE

No Drawing. Application filed April 7, 1928, Serial No. 268,374, and in Germany July 29, 1927.

This invention relates to a process for the production of trinitrotoluene.

In the production of trinitrotoluene from dinitrotoluene according to the hitherto known methods, the mixed acids are added to dinitrotoluene heated in the nitrating apparatus to above its melting point, or nitric acid is added to dinitrotoluene dissolved in sulphuric acid whilst stirring and gradually increasing the temperature.

According to a later process difficulties which may arise in this kind of nitration are obviated by causing the ready mixed nitrating acid to flow into the fused dinitrotoluene whilst stirring and suitably cooling, at a temperature of 85° C.

In contradistinction to the hitherto usual processes, according to the present invention the dinitrotoluene is introduced in a fused state at temperatures of 80 to 95° C., into the mixed acids preheated up to 80° C., whilst stirring.

It has been found that, when operating in this way, the reaction will proceed on the one hand at a very high rate easily to be regulated and on the other hand also with the maximum safety of working.

It is well known that a considerable excess of nitric acid is required in order to nitrate dinitrotoluene into trinitrotoluene, which excess must, when adding the mixed acids or nitric acid to the fused dinitrotoluene, be available before the commencement of the nitration, even if the most favourable reaction temperature has been employed at the outset. If however the dinitrotoluene is added to the mixed acids whilst stirring, at a temperature of 80° C., it immediately meets with an excess of nitric acid and is instantaneously transformed into trinitrotoluene. This reaction is facilitated by virtue of the fact that the dinitrotoluene first dissolves completely, so that the reaction surface extends throughout the entire capacity of the apparatus. By changing the speed of introduction, the course of the reaction and thus the heat of reaction developed, can be accurately controlled. The inflow is advantageously so regulated that the temperature of the reaction mixture does not exceed 95° C.

The operation may also be carried out whilst cooling the apparatus.

The nitration proceeds rapidly and safely in the course of three to four hours and can be interrupted at any time without after-reactions occurring.

*Example.*—1000 kgs. of dinitrotoluene in a fused state are added whilst stirring to a mixture of 2665 kgs. of 20% oleum and 704 kgs. of nitric acid of 48° Bé. heated to 80° C.

1100 kgs. of trinitrotoluene solidifying at 77° to 79° C., are obtained.

What I claim is:

1. A process for the production of trinitrotoluene by the treatment of dinitrotoluene with mixed acids, which comprises making the dinitrotoluene in a fused state, at temperatures of 80 to 95° C. to flow into the mixed acids preliminarily heated to 80° C., whilst stirring.

2. In the process for the production of trinitrotoluene as claimed in claim 1, controlling the course of the reaction and the heat of reaction developed, by regulating the rate of inflow of the fused dinitrotoluene.

In testimony whereof I affix my signature.

FRIEDRICH THOMAS.